United States Patent
Duschatko et al.

(10) Patent No.: US 6,973,041 B1
(45) Date of Patent: Dec. 6, 2005

(54) PATH AIS INSERTION FOR CONCATENATED PAYLOADS ACROSS MULTIPLE PROCESSORS

(75) Inventors: Douglas E. Duschatko, McKinney, TX (US); Lane B. Quibodeaux, Allen, TX (US); Robert A. Hall, Richardson, TX (US); Andrew J. Thurston, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 09/607,912

(22) Filed: Jun. 30, 2000

Related U.S. Application Data
(60) Provisional application No. 60/211,559, filed on Jun. 15, 2000.

(51) Int. Cl.[7] .............................. H04J 3/06; H04L 12/26
(52) U.S. Cl. ........................ 370/244; 370/216; 370/503; 370/514
(58) Field of Search ................................ 370/216, 225, 370/226–228, 242–252, 503, 510, 512–522, 535, 907; 359/109, 110, 111, 115, 118, 154

(56) References Cited

U.S. PATENT DOCUMENTS

| | | | | |
|---|---|---|---|---|
| 5,265,096 A | * | 11/1993 | Parruck | 370/216 |
| 5,335,223 A | * | 8/1994 | Lino | 370/503 |
| 5,442,620 A | * | 8/1995 | Kremer | 370/224 |
| 5,471,476 A | * | 11/1995 | Hiramoto | 370/516 |
| 5,717,693 A | * | 2/1998 | Baydar et al. | 370/514 |
| 5,751,720 A | * | 5/1998 | Uematsu et al. | 370/503 |
| 6,041,043 A | * | 3/2000 | Denton et al. | 370/254 |
| 6,118,795 A | * | 9/2000 | Fukunaga et al. | 370/503 |
| 6,122,249 A | * | 9/2000 | Mochizuki et al. | 370/220 |
| 6,147,968 A | * | 11/2000 | De Moer et al. | 370/225 |
| 6,262,975 B1 | * | 7/2001 | Derbenwick et al. | 370/244 |
| 6,298,038 B1 | * | 10/2001 | Martin et al. | 370/216 |
| 6,301,254 B1 | * | 10/2001 | Chan et al. | 370/397 |
| 6,324,162 B1 | * | 11/2001 | Chaudhuri | 370/225 |
| 6,421,323 B1 | * | 7/2002 | Nelson et al. | 370/249 |
| 6,452,906 B1 | * | 9/2002 | Afferton et al. | 370/242 |
| 6,608,844 B1 | * | 8/2003 | Teodorescu et al. | 370/512 |
| 6,683,890 B1 | * | 1/2004 | Rossi et al. | 370/907 |

* cited by examiner

*Primary Examiner*—Man U. Phan
(74) *Attorney, Agent, or Firm*—Campbell Stephenson Ascolese LLP

(57) ABSTRACT

In a data transmission network, such as SONET, a method and apparatus for the generation of a path Alarm Insertion Signal (AIS) at the output of each of a number of concatenated pointer processors in response to a failure at the input of any one of the pointer processors. Each of the pointer processors has an input, an output and a bidirectional terminal that is coupled to a common node. Each of the pointer processors includes circuitry coupled to the input, the output and the bidirectional terminal that causes a predetermined logic level to be asserted at the bidirectional terminal in response to the appearance of an error signal at its input and that causes an AIS to appear at its output in response to either an error signal at its input or the assertion of the predetermined logic level at its bidirectional terminal.

16 Claims, 9 Drawing Sheets

Key To

| | | | | |
|---|---|---|---|---|
| A1 1502 | A2 1504 | J0 Z0 U 1506 | Payload Bytes | 1590 |
| B1 1510 | E1 U 1512 | F1 U 1514 | Payload Bytes | 1591 |
| D1 U 1520 | D2 U 1522 | D3 U 1524 | Payload Bytes | 1592 |
| H1 1530 | H2 1532 | H3 1534 | H4 1536 | Payload Bytes 1593 |
| B2 U 1540 | K1 U 1542 | K2 U 1544 | Payload Bytes | 1594 |
| D4 U 1550 | D5 U 1551 | D6 U 1552 | Payload Bytes | 1595 |
| D7 U 1553 | D8 U 1554 | D9 U 1555 | Payload Bytes | 1596 |
| D10 U 1556 | D11 U 1557 | D12 U 1558 | Payload Bytes | 1597 |
| S1 Z1 U 1570 | M1 Z2 U 1572 | E2 U 1574 | Payload Bytes | 1598 |

SONET Frame 1500

*FIG. 6*

PATH AIS INSERTION FOR CONCATENATED PAYLOADS ACROSS MULTIPLE PROCESSORS

CROSS REFERENCE TO RELATED APPLICATIONS

This Application claims benefit of priority based on Provisional Patent Application No. 60/211,559, entitled "Path AIS Insertion For Concatenated Payloads Across Multiple Processors," by the same inventors as this Application and filed on Jun. 15, 2000.

INCORPORATION BY REFERENCE

The following U.S. Patent Applications are hereby incorporated into this Patent Application by reference, in their entirety and for all purposes:

U.S. patent application Ser. No. 09/232,397, filed Jan. 15, 1999, and entitled "A METHOD FOR ROUTING INFORMATION OVER A NETWORK," having A. N. Saleh, H. M. Zadikian, Z. Baghdasarian, and V. Parsi as inventors;

U.S. patent application Ser. No. 09/232,395, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors;

U.S. patent application Ser. No. 09/232,396, U.S. Pat. No. 6,631,134, filed Jan. 15, 1999 and entitled "METHOD OF ALLOCATING BANDWIDTH IN AN OPTICAL NETWORK," having H. M. Zadikian, A. Saleh, J. C. Adler, Z. Baghdasarian, and V. Parsi as inventors;

Provisional Patent Application No. 60/174,323, filed Jan. 4, 2000, and entitled "A RESOURCE MANAGEMENT PROTOCOL FOR A CONFIGURABLE NETWORK ROUTER" having H. M Zadikian, A. Saleh, J. C. Adler, Z. Baghdasarian and Vahid Parsi as inventors;

U.S. patent application Ser. No. 09/477,217, filed Jan. 4, 2000, and entitled "FAULT ISOLATION IN A SWITCHING MATRIX," having R. A. Russell and M. K. Anthony as inventors;

U.S. patent application Ser. No. 09/389,302, filed Sep. 2, 1999, and entitled "NETWORK ADDRESSING SCHEME FOR REDUCING PROTOCOL OVERHEAD IN AN OPTICAL NETWORK," having A. Saleh and S. E. Plote as inventors;

U.S. patent application Ser. No. 09/478,235, filed Jan. 4, 2000, and entitled "A METHOD FOR PATH SELECTION IN A NETWORK," having A. Saleh as inventor;

U.S. patent application Ser. No. 09/477,498, filed Jan. 4, 2000, and entitled "METHOD OF PROVIDING NETWORK SERVICES," having H. M. Zadikian, S. E. Plote, J. C. Adler, D. P. Autry, and A. Saleh as inventors;

U.S. patent application Ser. No. 09/608,097, filed Jun. 30, 2000, entitled "CONCATENATION DETECTION ACROSS MULIPLE CHIPS," to Douglas E. Duschatko, Lane Byron Quibodeaux, Robert A. Hall, and Andrew J. Thurston as inventors;

U.S. patent application Ser. No. 09/609,577, filed Jun. 30, 2000, entitled "FIXED ALGORITHM FOR CONCATENATION WIRING," to Vahid Parsi and Andrew J. Thurston as inventors; and U.S. patent application Ser. No. 09/608,461, filed Jun 30, 2000, entitled "CHANNEL ORDERING FOR COMMUNICATION SIGNALS SPLIT FOR MATRIX SWITCHING," to Douglas E. Duschatko, Lane Byron Quibodeaux, Robert A. Hall, Andrew J. Thurston as inventors.

The above Patent Applications are all assigned to Cisco Technology, Inc.

BACKGROUND OF THE INVENTION

1. Field of the Invention

This invention relates to techniques for the synchronous transmission of information and, more particularly, to a method and apparatus for distributing an alarm signal when any one of a plurality of concatenated processors detects a fault in a signal that constitutes part of a concatenated payload.

2. Description of the Related Art

A data communications network effects the interconnection of two or more communicating entities (i.e., data sources and/or sinks) over one or more data links. A data communications network allows communication between multiple communicating entities over one or more data communications links. High-bandwidth applications supported by these networks include streaming video, streaming audio, and large aggregations of voice traffic. In the future, the demand for such applications is certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among the protocols designed to employ an optical infrastructure and is widely employed in voice and data communications networks. SONET is a physical transmission vehicle capable of transmission speeds in the multi-gigabit range, and is defined by a set of electrical as well as optical standards.

In some networks, network nodes store data that are used for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995) incorporated herein by reference. An STS-1 is a Synchronous Transport Signal-level 1 is the basic module in SONET and is defined as a specific sequence of 810 bytes (6480 bits), including overhead bytes and an envelope capacity for transporting payloads. In general, the higher-level signals, the STS-N signals, are lower-level modules that are multiplexed together and converted to an OC-N or STS-N signal. An STS-N frame is a sequence of N×810 bytes wherein N is a predetermined number. An STS-N is formed by byte-interleaving of STS-1 and STS-M modules, wherein M is less than N.

In some systems, such as certain ISDN and ATM systems, multiple STS-1 payloads are transported as super-rate payloads. To accommodate such a payload, an STS-Nc module is formed by linking N constituent STS-1s together in fixed phase alignment. The N STSs are linked in N pointer processors that are implemented with N application-specific integrated circuits (ASIC). The pointer processors operate, inter alia, to provide a method for flexible and dynamic alignment of the STS SPE within the STS envelope. Dynarmic alignment means that the pointer processor can accommodate differences in the phases and frame rate of the STS SPE and the transport overhead, such as occurs, for example, when network elements are running at slightly different clock rates. This difference occurs when the frame is transported from one network to another and when each network derives its master clock from different sources.

The payload is then mapped into a single STS-Nc Synchronous Payload Envelope (SPE) for transport. Network equipment supporting the multiplexing, switching or transport of STS-Nc SPEs treat an STS-Nc SPE as a single entity. When an STS-Nc SPE is treated as a single entity, concatenation indicators are sent in the second through the Nth STS payload pointers. The pointers indicate that the STS-1s in the STS-Nc are linked. The concatenation indicators do not, however, indicate when a concatenated STS-Nc is spread across multiple pointer processors ASICs. Accordingly, it is desirable to have a system and method for detecting a concatenated STS-Nc payload that is distributed among multiple pointer processor ASICs. Such a system and method is described in U.S. patent application Ser. No. 09/608,097, entitled "CONCATENATION DETECTION ACROSS MULTIPLE CHIP", filed on the same date as this Application, and hereby incorporated in its entirety into this Application.

In addition, concatenated payloads are susceptible to interface failures on one or more of the pointer processors. Examples of such failures include Loss of Signal (LOS), Loss of Frame (LOF), and Loss of Pointer (LOP). If an interface failure occurs on any pointer processor, the entire concatenation signal is unrecoverable. Accordingly, the SONET specifications require the prompt insertion of a path AIS (Alarm Insertion Signal) on the entire STS-Nc payload. Because the specified insertion time, 125 µseconds, is not amenable to a software implementation, a hardware solution to timely AIS insertion is virtually compelled. However, because the pointer processor ASICs are pin-limited, an effective hardware response is not easily had. Accordingly, what is desired is a hardware approach to AIS insertion in the context of a concatenated payload. The approach must effect AIS insertion in the limited time specified and, fulrther, must conform to the limited pin availability of pointer processor ASICs.

SUMMARY OF THE INVENTION

The above and other of objects, advantages and capabilities are achieved, in one aspect of the invention, by a data transmission system for transmitting a payload constituted from a number of concatenated signals. The data transmission system comprises a demultiplexer having an input for coupling to the payload and having plurality of outputs; a multiplexer having a plurality of inputs; a plurality of pointer processors, each having an input coupled to a respective output of the demultiplexer and having an output coupled to a respective input of the multiplexer. Each of the pointer processors comprises: (a) a bidirectional terminal coupled to a common node, (b) and circuitry coupled to the processor input, output and bidirectional terminal, the circuitry for (i) causing a logic level to be asserted at the common node in response to an error signal at the processor input, and (ii) causing an alarm signal to appear at the processor output in response to the application of a logic level signal at the processor bidirectional terminal.

In another aspect, the invention may be exploited in an information transmission system for transmitting an information payload that comprises a plurality of concatenated signals that are demultiplexed into a plurality of concatenated processors, processed in the plurality of processors, and then multiplexed in a multiplexer. The method involves inserting an alarm signal and comprises the steps: (a) detecting an error at one of the processors; (b) asserting a logic level at a bidirectional terminal of the processor at which the error is detected; (c) coupling the asserted logic level to a respective bidirectional terminal of each of the other processors; and (d) causing an alarm signal to appear at the outputs of all the processors. In a preferred implementation, performance of the method is contingent on the reception of a concatenation signal that signifies that the signals distributed to the processors constitute a concatenated payload.

Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 6 illustrates a standard frame of the synchronous optical network protocol;

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the division of the detailed description into separate sections is merely done as an aid to understanding and is in no way intended to be limiting.

An Exemplary Network Element

Figure 1A:
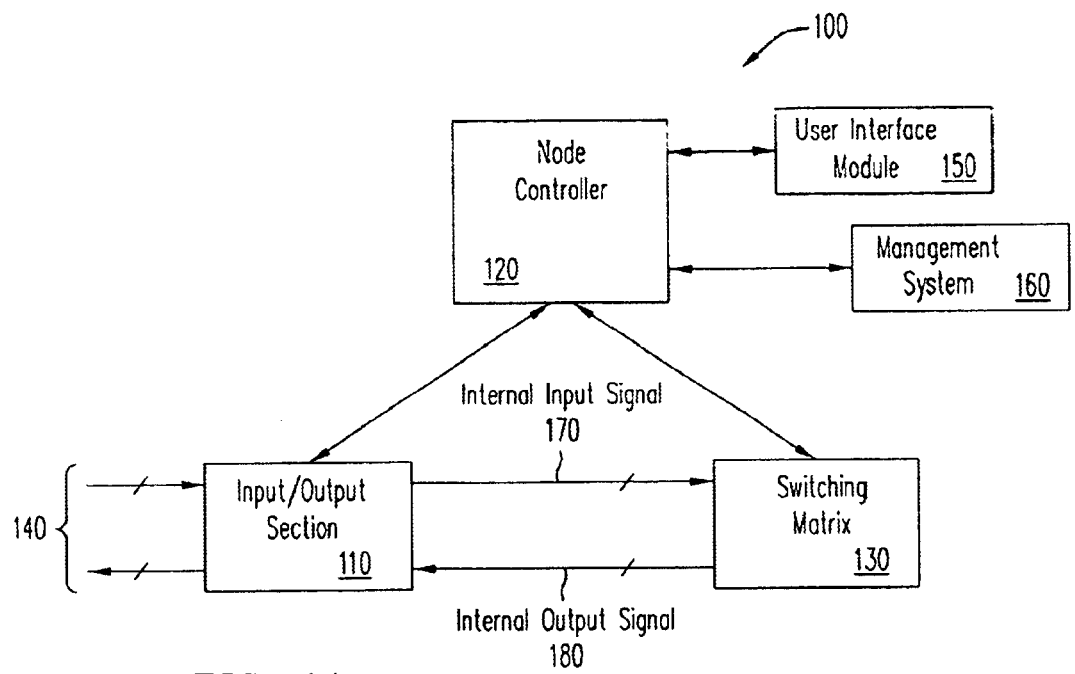
FIG. 1A is a block diagram of an exemplary router.

FIG. 1A illustrates a router 100. Router 100 includes an input/output section 110, a node controller 120, a switching matrix 130. Node controller 120 contains, for example, real time software and intelligent outing protocols (not shown). Router 100 supports interfaces including, but not limited to, optical signal interfaces 140 (e.g., SONET), a user interface module 150, and a management system 160. Internal input signals 170 and internal output signals 180 may be electrical or optical in nature.

Figure 1B:
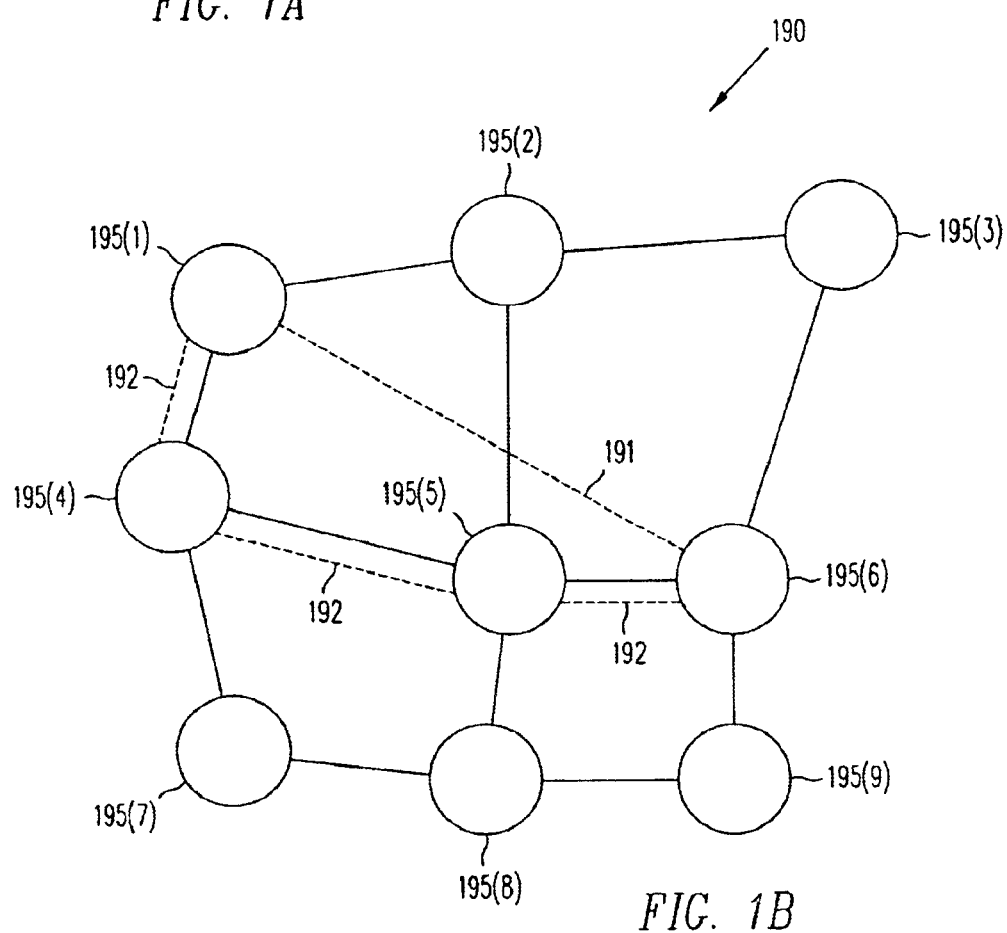
FIG. 1B is a block diagram of a network including a number of the routers of FIG. 1A.

FIG. 1B illustrates a network 190 that includes a number of nodes, network nodes 195(1)-(N). One or more of network nodes 195(1)-(N) can be a router such as router 100.

Network 190 can thus support the automatic provisioning, testing, restoration, and termination of virtual paths (exemplified by a virtual path 191) over a physical path (exemplified by a physical path 192) from one of network nodes 195(1)-(N) to another of network nodes 195(1)-(N).

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing duplexing, and similar duties.

Signal Path

Figure 2:
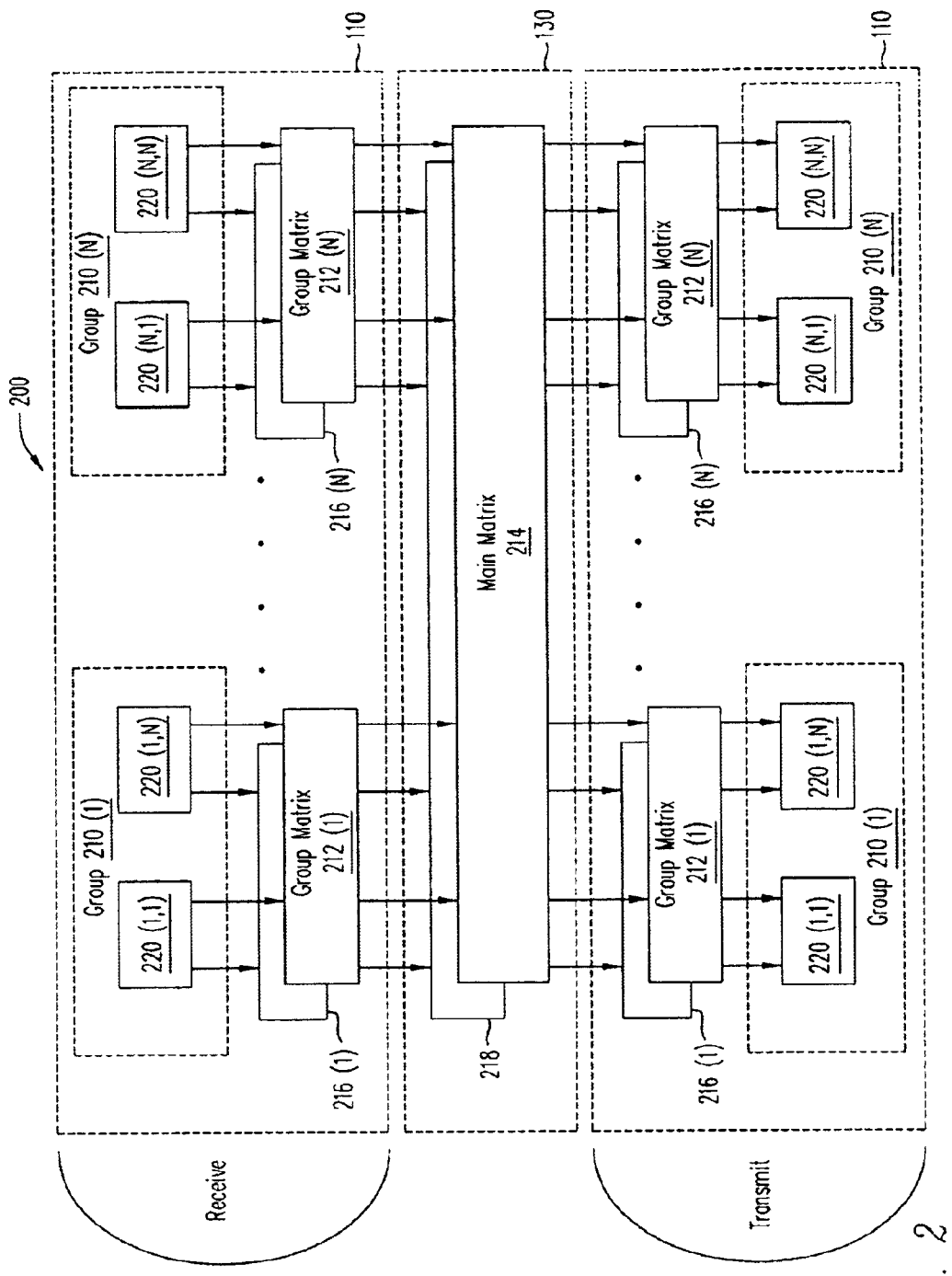
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)-N, group matrices 212(1)-(N), and a main matrix 214. As depicted in FIG. 1A, groups 210(1)-(N), and group matrices 212(1)-(N) are shown as having receive and transmit sections. Groups 210(1)-(N) each include line cards 220(1,1)-(N,N), through line cards 220(N,1)-(N,N). Signals from line cards 220(1,1)-(N,N) are sent to the corresponding group matrix. In one embodiment, two sets of the group matrix cards, group matrices 212(1)-(N) and 216(1)-(N) are employed. Main matrix 214 is also mirrored in one embodiment by a redundant copy, a backup main matrix 218, which together form switching matrix 130. As shown in FIG. 2, the redundancy for group matrices 212(1)-(N) (i.e., group matrices 216(1)-(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)-(N), line cards 220(1,1)-(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)-(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)-(N) and 216(1)-(N) in FIG. 1A. In one embodiment, group matrices 212(1)-(N) and 216(1)-(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)-(N) and 216(1)-(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)-(N,N) receive optical signals from group matrices 212(1)-(N) and 216(1)-(N) which are in turn connected to two separate copies of the main matrix. Line cards 220(1,1)-(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)-(N,N) to select between the two copies of the group matrix without any level-1 or level-2 CPU intervention. This helps to ensure that such a switch can be made in 50 ms or less (per Bellcore's recommendations in GR-253 (GR-253: Synchronous Optical Network (SONET) Transport Systems, Common Generic Criteria, Issue 2 [Bellcore, Dec. 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
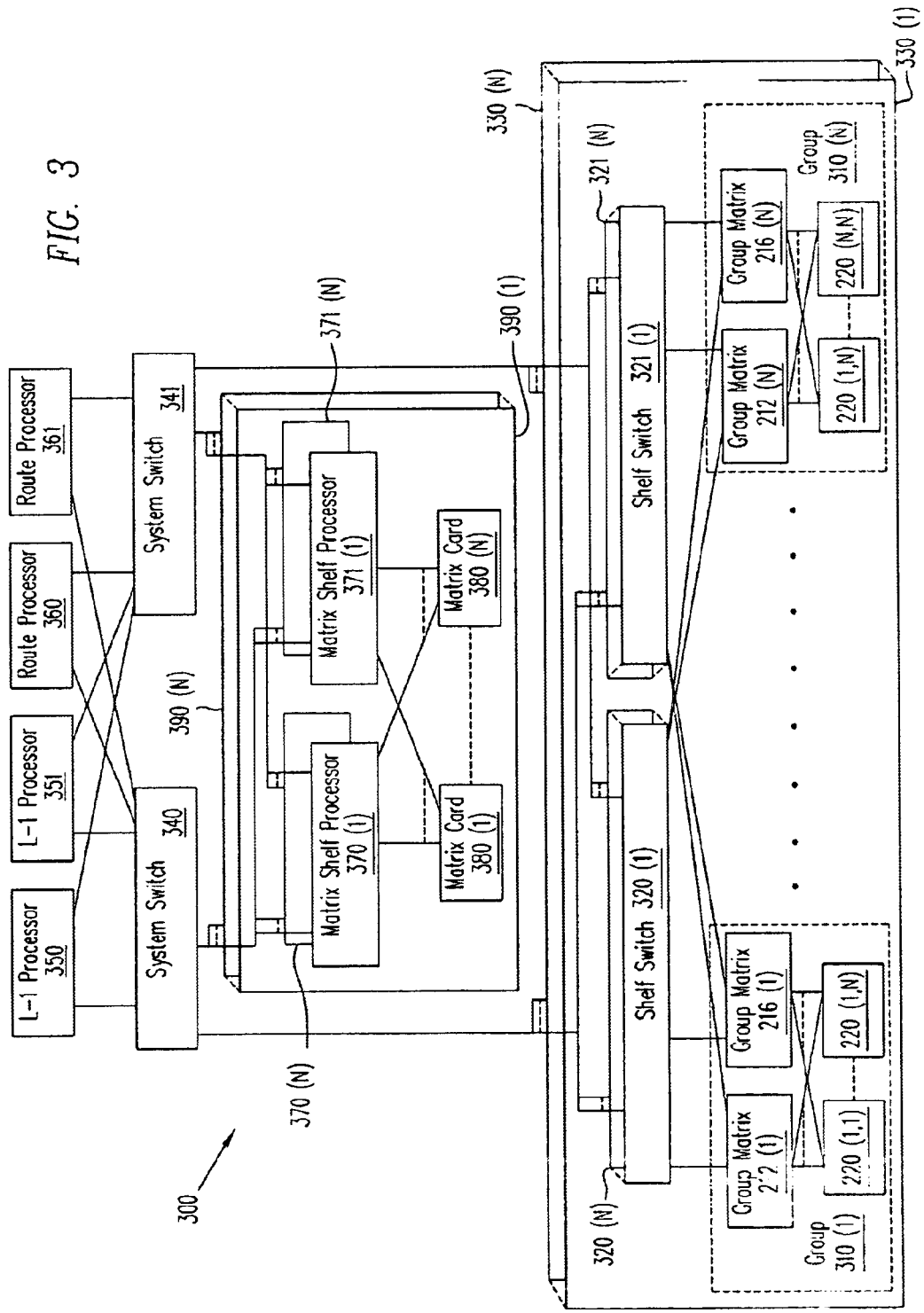
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)-(N) and 216(1)-(N). Each one of group matrices 212(1)-(N) and 216(1)-(N), also referred to herein as a hub, a repeater, or concentrator, is a physical layer device and preferably supports a star network topology, such as the IEEE 802.3 10BASE-T networking standard. The redundant connections from line cards 220(1, 1)-(N,N) in each of groups 310(1)-(N) are connected to two repeaters that reside on two separate copies of the group matrix module. Preferably, each one of line cards 220(1,1)-(N,N) supports two network-ports (e.g., 10BASE-T Ethernet ports). The two sets of four signals from each port pass through a relay that selects one of them for connection to the LAN for purposes of redundancy. Groups 310(1)-(N) represent the first layer of the control bus hierarchy. Group matrices 212(1)-(N) and 216(1)-(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320 (1)-(N) and 321(1)-(N), and groups 310(1)-(N). Groups 310(1)-(N) are again shown, with regard to the control functions thereof. In this depiction of groups 310(1)-(N), line cards 220(1,1)-(N,N) are shown as being attached to networking devices, indicated here as group matrices. Group matrices 212(1)-(N) and 216(1)-(N) may be, for example, multi-port Ethernet hubs running at 10 Mbps. Each of line cards 220(1,1)-(N,N) feed signals into two of group matrices 212(1)-(N) and 216(1)-(N). For example, line card 220(1,1) feeds received information to group matrices 212(1) and 216(1). Group matrices 212(1)-(N) and 216(1)-(N) each feed a signal into shelf switches 320(1)-(N) and 321(1)(N) of FIG. 2. Shelf switches 320(1)-(N) and 321(1)-(N) are each controlled by a shelf processor (not shown for the sake of clarity) and m communicate with one of the system switches (not shown, for the sake of clarity).

Shelf switches 320(1)-(N) and 321(1)-(N) are the next higher level of the control hierarchy in router 100, and are located on the shelf processor module (exemplified by line racks (330(1)-(N)). Each copy of shelf switches 320(1)-(N) and 321(1)-(N) interconnects six connections from the three groups in each shelf, another connection from the shelf processor, and one connection from system switch 340 (and 341). Shelf switches 320(1)-(N) and 321(1)-(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)-(N) and 321(1)-(N);
2. High-speed connection(s) to higher-level processors (e.g., redundant level-1 processors 350 and 351, and redundant route processors 360 and 361); and
3. High-speed connection(s) to matrix shelf processors 370(1)-(N) and 371(1)-(N) which, in turn, control matrix cards 380(1,1)-(1,N)), located in main matrix racks 390(1)-(N).

It will be noted that main matrix 214 includes matrix cards 380(1,1)-(1,N), and that, more generally, main matrices 214 and 218 are included matrix racks 390(1)-(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

System Modules

Line Card

Figure 4:
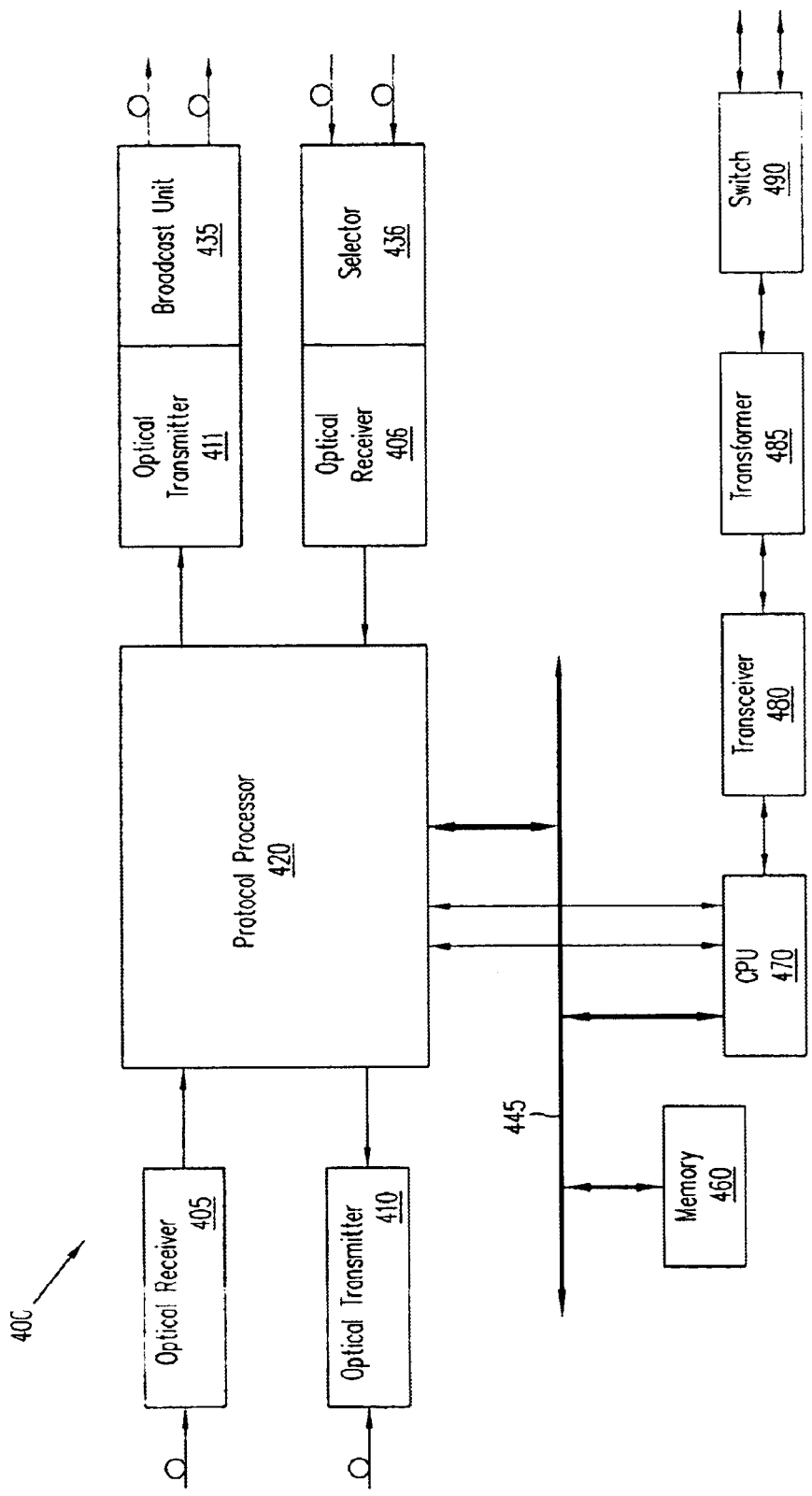
FIG. 4 illustrates the major components of one of the line cards.

FIG. 4 illustrates the major components of one of line cards 220(1,1)-(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled io other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards.

Also coupled to bus 445 are a memory 460 and a CPU 470. Memory 460 should be fast enough for efficient operation of CPU 470.

CPU 470 communicates with other of line cards 220(1,1)-(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

A shelf processor module provides, among other elements, a shelf processor and switch that interconnect the LAN segments from the groups and the shelf processor to a port on the shelf switch.

The shelf processor is responsible for the overall operation, management, and control of the shelf. A network switch interconnects the lower speed inter-processor communication network segments in each shelf. In one embodiment, the network switch provides support for 10 Mbps and 100 Mbps segments.

In certain embodiments, the shelf processor is able to connect to two separate Ethernet segments. This can implement a 1:1 protection scheme that allows the shelf processor to recover from failures on the active segment by simply switching to the other segment.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor (s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Figure 5A:
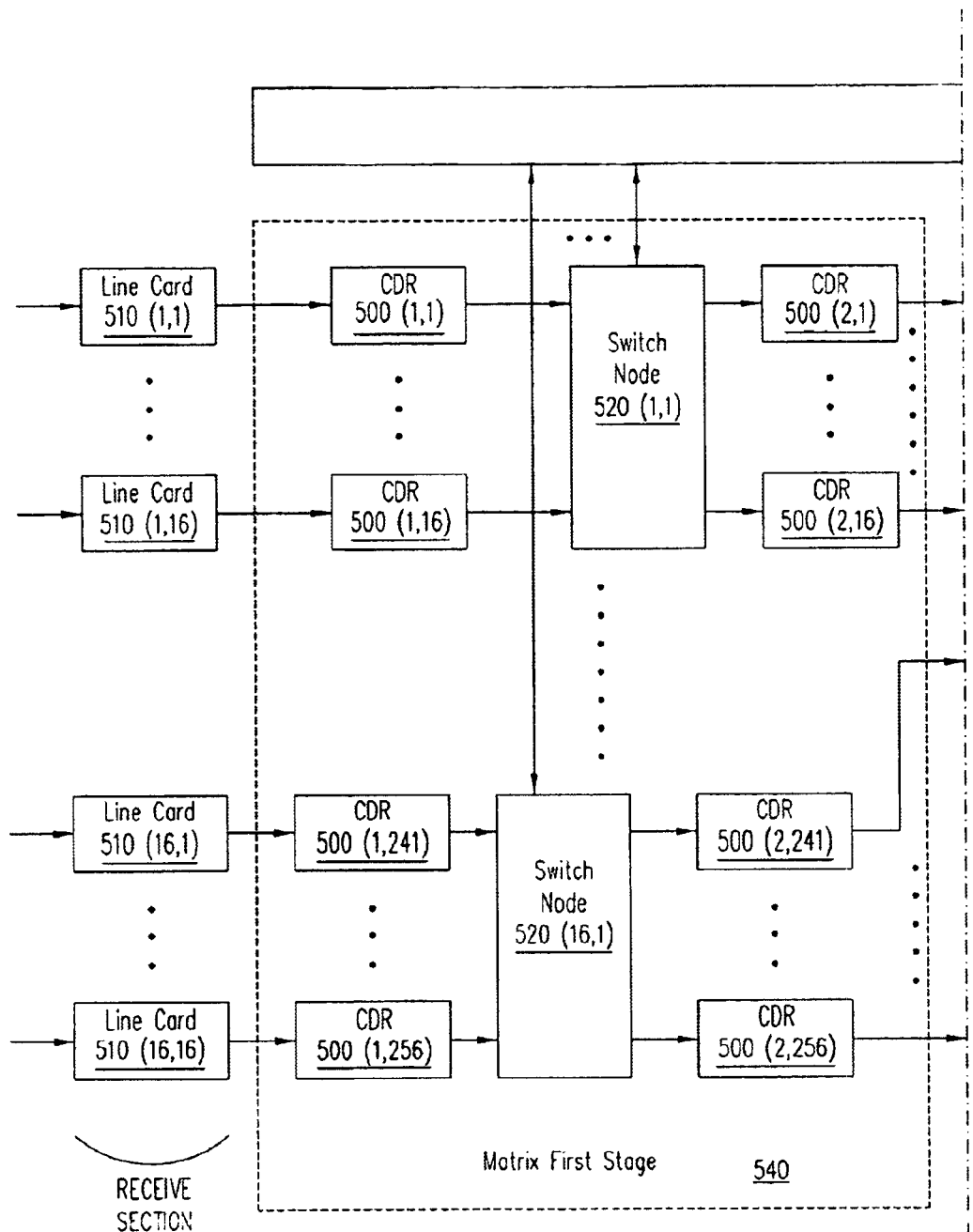
FIG. 5 illustrates a view of a switching matrix that includes clock/data recovery units and connections to the line cards.
Figure 5:
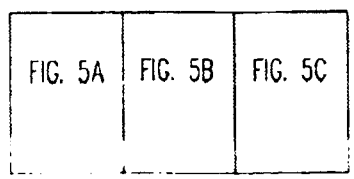
Figure 5B:
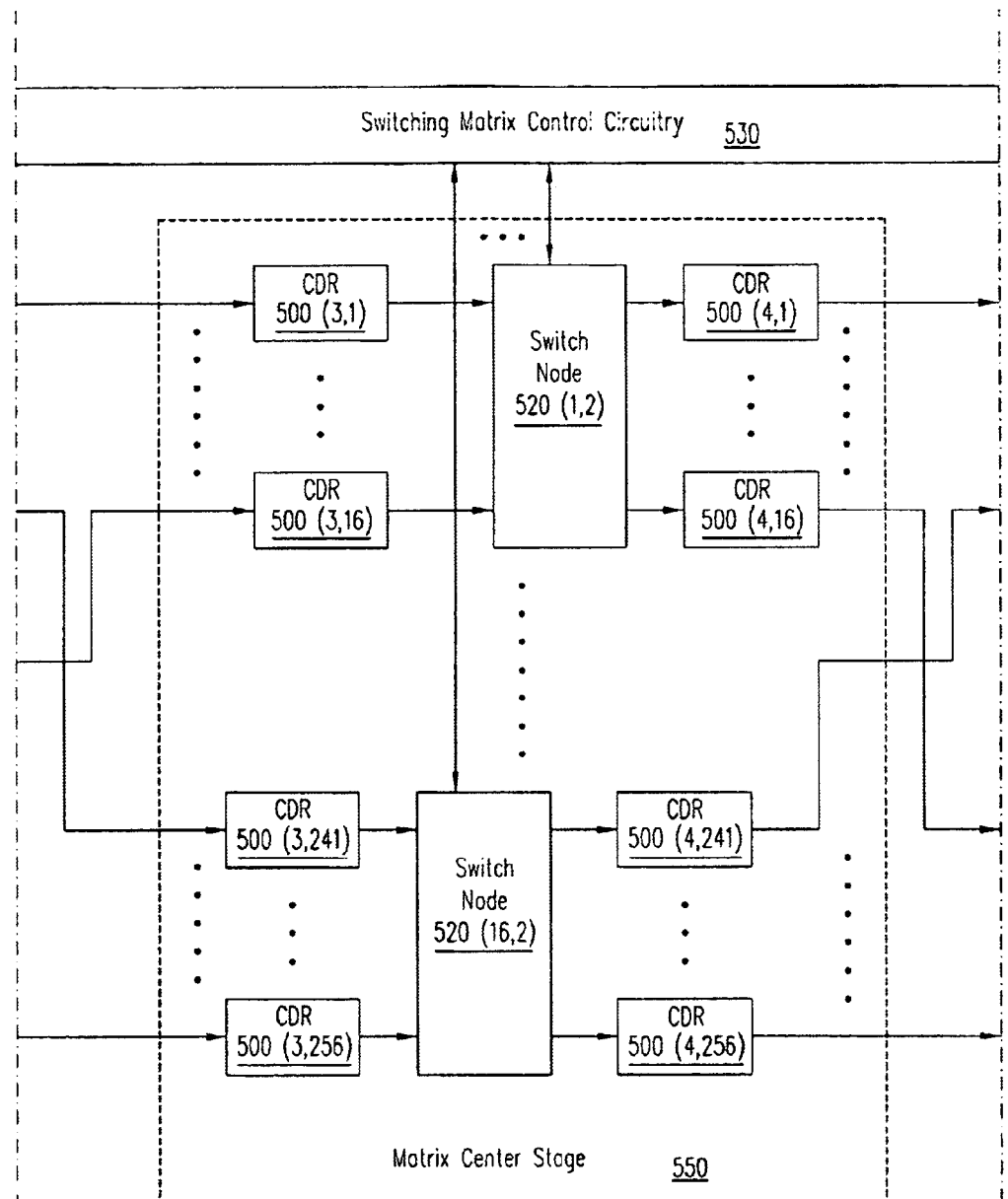
Figure 5C:
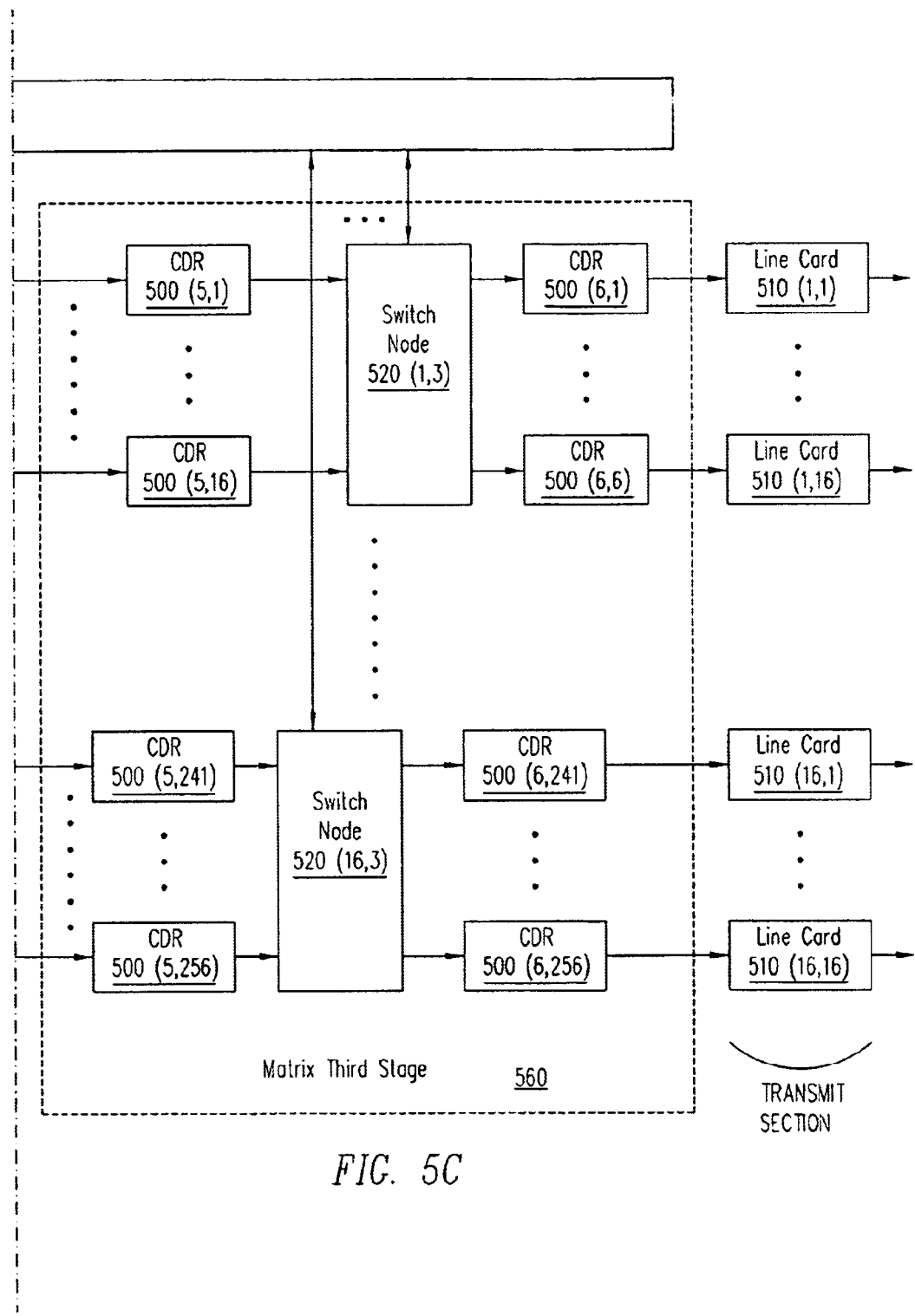

FIG. 5 illustrates a simplified view of switching matrix 130, including connections to the line cards. The depiction of switching matrix 130 in FIG. 5 shows certain other details, such as clock/data recovery units (CDRs) 500(1,1)-(6,256) and line cards 510(1,1)-(16,16). A CDR recovers clock and data information from a serial bitstream by recovering the clocking signal from the incoming bitstream (e.g., using a phase-locked loop (PLL)), and then recovering the data using the clock thus recovered.

It will be noted that line cards 510(1,1)-(16,16) correspond loosely to line cards 220(1,1)-(N,N), as depicted in FIG. 2. It will also be noted that line cards 510(1,1)-(16,16) are each shown as being divided into a receive section and a transmit section as shown in FIG. 5, again in a fashion similar to that depicted in FIG. 2. Also depicted in FIG. 5 are switch nodes 520(1,1)-(16,3) and a switching matrix control circuit 530. More generically, the control function represented by switching matrix control circuitry 530 is depicted in FIG. 3 as matrix shelf processors 370(1)-(N) and 371(1)-(N). As previously noted, switch nodes 520(1,1)-(16,3) and their related CDRs are divided into three stages, which are depicted in FIG. 5 as matrix first stage 540, matrix center stage 550, and matrix third stage 560. It will be noted that matrix first stage 540, matrix center stage 550, and matrix third stage 560 correspond to the matrix stages represented by switch nodes 1100(1,1)-(16,1), switch nodes 1100(1,2)-(16,2), and switch nodes 1100(1,3)-16,3). It will also be noted that the transmit side of line cards 510(1,1)-(16,16) each include CDR functionality.

FIG. 6 illustrates a standard frame of the synchronous optical network (SONET) protocol, exemplified here by a SONET frame 1500. SONET frame 1500 is divided horizontally into ninety columns and is divided vertically into nine rows. The first three columns of SONET frame 1500 contain overhead bytes used for framing, communications, and other purposes. The remaining 87 columns contain data and are collectively referred to as payload. The overhead bytes include an A1 byte 1502, an A2 byte 1504, a JO/ZO byte 1506, a B1 byte 1510, an E1 byte 1512, an F1 byte 1514, a D1 byte 1520, a D2 byte 1522, a D3 byte 1524, an H1 byte 1530, byte 1532, an H3 byte 1534, an H4 byte 1536, a B2 byte 1540, a K1 byte 1542, a K2 byte a D4 byte 1550, a D5 byte 1551, a D6 byte 1552, a D7 byte 1553, a D8 byte 1554, a D9 byte 1555, a D10 byte 1556, a D11 byte 1557, a D12 byte 1558, an S1/Z1 byte 1570, an M1/Z2 byte 1572, and an E2 byte 1574. Also included in SONET frame 1500 is payload data, represented here by payload bytes 1590–1598. It will be noted that each of payload bytes 1590–1598 includes 87*48 bytes of data for an OC-48 SONET frame (except payload bytes 1593, which includes 86*48 bytes of data (due to the existence of H4 byte 1536)).

Figure 7:
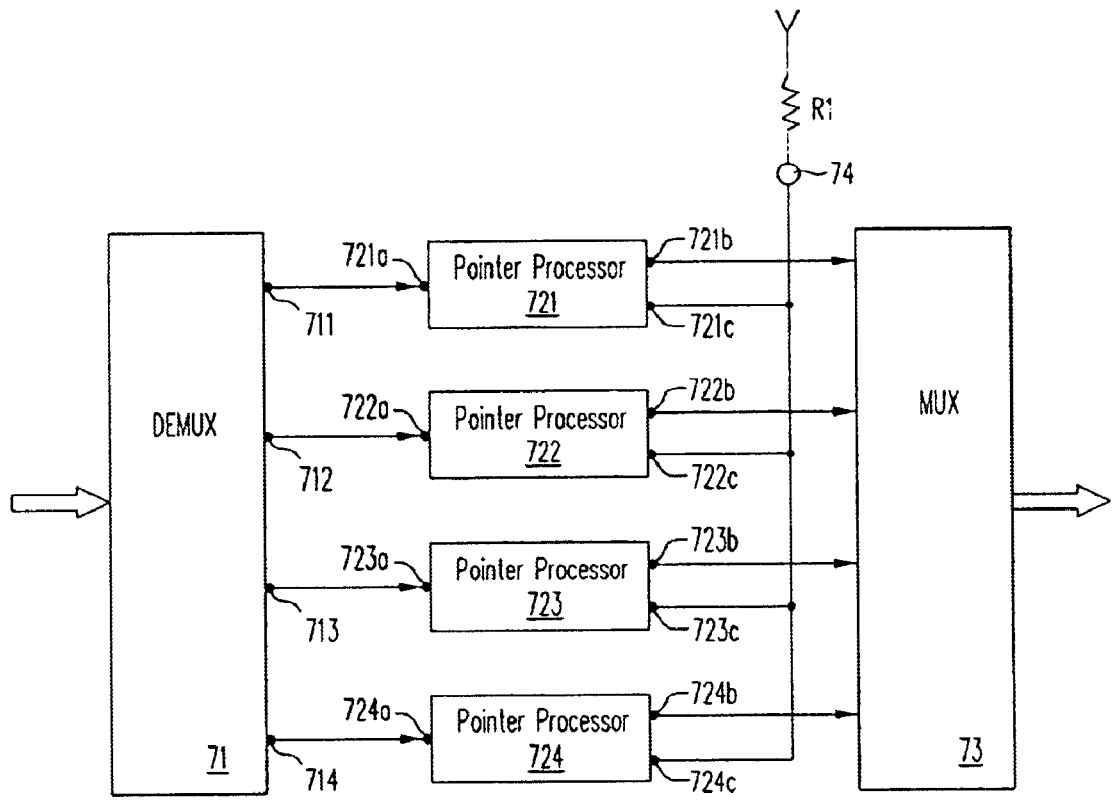
FIG. 7 is block diagram of portions of a SONET-compatible system relevant to the subject invention, including a demultiplexer 71, a plurality of concatenated pointer processors 721, 722, 723 and 724, and a multiplexer 73.

The above explication of a SONET-compliant information communications system has been provided largely for contextual purposes. That is, the invention at hand is intended for use, in a system as described above, as a technique for the distribution of an AIS signal in response to the receipt of an error signal in a concatenated payload. Referring now to FIG. 7, the concatenated signal is demultiplexed by a demultiplexer 71. Demultiplexer 71 has a plurality of outputs, 711, 712, 713, and 714, each of which is coupled to a respective input of one of a plurality of pointer processors 721, 722, 723, and 724. That is, demultiplexer output 711 is coupled to input 721a of processor 721, demultiplexer output 712 to input 722a of processor 722, demultiplexer output 713 to input 723a of processor 723, and demultiplexer output 714 to input 724a of processor 724. The respective outputs of the processors, 721b, 722b, 723b, and 724b, are coupled to associated inputs of multiplexer 73. For reasons that imminently will be made clear, each of pointer processors 721, 722, 723, and 724 has a respective bidirectional terminal, 721c, 722c, 723c, and 724c, coupled to a common node 74. The common node is, in turn coupled through a resistance, R1, to a voltage, V$^+$.

In operation, whenever a defect or failure is detected by one of processors 721, 722, 723, or 724 circuitry within the respective processor causes current to be drawn into bidirectional pin 721c, 722c, 723c, or 724c. As a result, the voltage at the bidirectional pin of the detecting processor, and, consequently, of all the other processors, is drawn low. A logic level ZERO equivalently appears at all the bidirectional pins. The logical ZERO causes an AIS signal to appear at the outputs 721b, 722b, 723b, and 724b of all the pointer processors. Numerous circuit implementations are capable of the above result. An exemplary embodiment is illustrated in FIG. 8.

Figure 8:
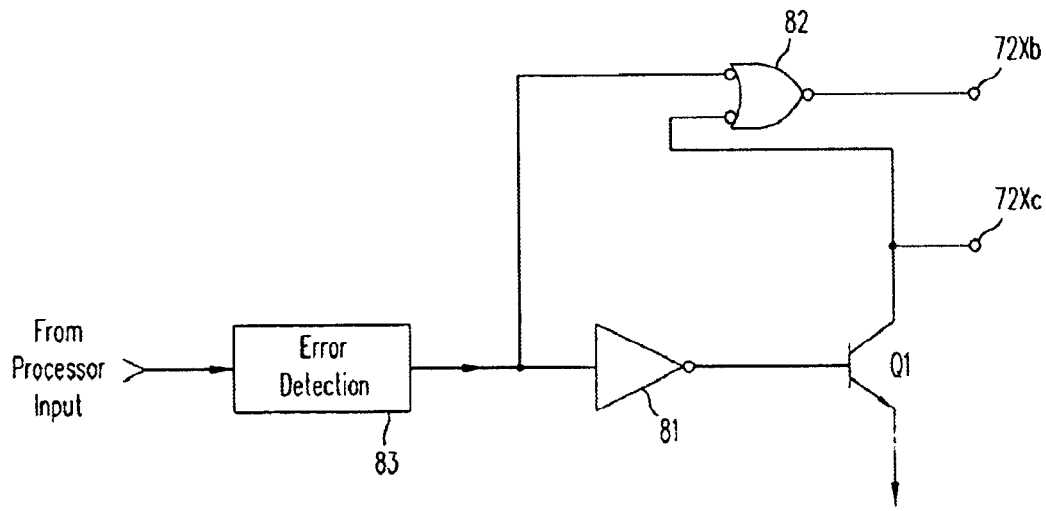
FIG. 8 is a circuit diagram of elements of a pointer processor that operate to cause an AIS signal to be generated at the output of all processors when an error is detected at any one of the processors.

Referring now to FIG. 8, the pointer processor generates an Error Detection signal that is assumed to be negative-going. The Error Detection signal may, in a preferred embodiment, be programmable and derived from SONET failure signals, such as, LOS (Loss of Signal), LOF (Loss of Frame), OOF (Out of Frame), AIS_L or LOP_P, or may result when a processor detects that an STS_Nc is not present. In any event, the occurrence of an Error Detection signal is coupled through an inverter 81 to input of a Wire-Or'd transistor Q1. When transistor Q1 becomes conductive, a logic ZERO will be asserted at the bidirectional pin of the detecting processor. The logic ZERO will also appear at the bidirectional terminal, 72Xc, of the other processors. Either the Error Detection signal or the logical ZERO at the bidirectional terminal will cause an alarm signal, AIS, to appear at each of the processor outputs 721b, 722b, 723b, and 724b.

The alarm signal is seen in FIG. 8 to originate at the output of a dual-negative-input OR gate 82. Therefore, whenever the output of Error Detection module or the logic level at the bidirectional terminal 72Xc of a processor is active (low), an alarm signal appears at associated output terminal 72Xb.

Those skilled in the art will recognize that the illustration of FIG. 8 is intended to be exemplary and is not intended to delimit the scope of the invention. For example, the polarities of logic signals appearing in FIG. 8, including but not limited to the Error Detection signal at the output of module 83, the respective inputs and output of logic elements 81 and 82, and the signals at terminals 72Xb and 72Xc, may be varied without departing from the inventive concept. In addition, implicit in the operation of module 83 is the feature that the input to Q1 is allowed to become active only when the presence of a concatenated payload is detected. This detection may be performed by module 83 or, alternatively, otherwise detected and inserted as a gate, either to the input or at the output, of inverter 81.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A data transmission system for transmitting a payload constituted from a number of concatenated signals, the system comprising:
 a demultiplexer having an input for coupling to the payload and having plurality of outputs;
 a multiplexer have a plurality of inputs;
 a plurality of pointer processors, each having an input coupled to a respective output of the demultiplexer and having an output coupled to a respective input of the multiplexer, wherein each of the pointer processors comprises:
  (a) a bidirectional terminal coupled to a common node, and
  (b) circuitry coupled to the processor input, processor output and bidirectional terminal, the circuitry for:
   (i) causing a logic level to be asserted at the common node in response to an error signal at the processor input, and
   (ii) causing an alarm signal to appear at the processor output in response to the application of a logic level signal at the processor bidirectional terminal by at least one of the plurality of pointer processors.

2. A data transmission system as defined in claim 1, wherein the bidirectional terminal of each of the plurality of processors is coupled to the common node and the common node is coupled through a resistance to a voltage, $V^+$, so that in the absence of an alarm signal at all the processor inputs, the voltages at the bidirectional terminals of the processors approaches $V^{30}$.

3. A data transmission system as defined in claim 2, wherein as a result of an error signal at the input of any processor, the voltages at the bidirectional terminals of all the processors approach a reference voltage.

4. In an information transmission system for transmitting an information payload that comprises a plurality of concatenated signals that are demultiplexed into a plurality of concatenated processors, processed in a plurality of processors, and then multiplexed in a multiplexer, a method of inserting an alarm signal comprising the steps:
 (a) detecting an error at one of the processors;
 (b) causing at least one of said concatenated processors to assert a logic level at a bidirectional terminal of the processor at which the error is detected;
 (c) coupling the asserted logic level to a respective bidirectional terminal of each of the other processors; and
 (d) causing an alarm signal to appear at the outputs of all the processors in response to said asserted logic level.

5. A method as defined in claim 4, wherein the alarm signals are applied to the multiplexer.

6. A method as defined in claim 4, wherein the method is performed only when a concatenation signal is received that signifies that signals distributed to the processors constitute a concatenated payload.

7. A pointer processor for an information transmission system, the pointer processor comprising:
 an input terminal for coupling to an output of a demultiplexer;
 an output terminal for coupling to an input of a multiplexer;
 a bidirectional terminal coupled to a common node; and
 alarm means coupled to the input terminal, to the output terminal and to the bidirectional terminal for:
  (i) causing a predetermined logic level to be asserted at the common node in response to an error signal at the processor input, and
  (ii) causing an alarm signal to appear at the processor output in response to the application of the predetermined logic level at the processor bidirectional terminal by said pointer processor.

8. A pointer processor as defined in claim 7, wherein the alarm means includes an error detector for detecting an error in a signal that is included as a component of a concatenated payload.

9. A pointer processor as defined in claim 8, wherein the error detector detects the presence of an STS-Nc signal.

10. A pointer processor as defined in claim 8, wherein the error detector detects one or more of the following errors in a SONET-compliant system: LOS, LOF, AIS_L and LOP.

11. A pointer processor as defined in claim 7, wherein the alarm means comprises:
 an error detector;
 a wired-OR logic element coupled between the error detector and the bidirectional terminal; and
 a combinational logic element having inputs respectively coupled to the error detector and the wired-OR logic element and an output coupled to the output of the processor.

12. A pointer processor as defined in claim 11, wherein the error detector detects the presence of an STS-Nc signal.

13. A data transmission system for transmitting a payload constituted from a number of concatenated signals, the system comprising:
- a demultiplexer having an input for coupling to the payload and having plurality of outputs;
- a multiplexer have a plurality of inputs;
- a plurality of pointer processors, each having an input coupled to a respective output of the demultiplexer and having an output coupled to a respective input of the multiplexer, wherein
  each of the pointer processors comprises:
    (a) a bidirectional terminal coupled to a common node, and
    (b) circuitry coupled to the processor input, processor output and bidirectional terminal, the circuitry for:
       (i) causing a logic level to be asserted at the common node in response to an error signal at the processor input, and
       (ii) causing an alarm signal to appear at the processor output in response to the application of a logic level signal at the processor bidirectional terminal, and
  the bidirectional terminal of each of the plurality of processors is coupled to the common node and the common node is coupled through a resistance to a voltage, $V^+$, so that in the absence of an alarm signal at all the processor inputs, the voltages at the bidirectional terminals of the processors approaches $V^+$.

14. A data transmission system as defined in claim 13, wherein as a result of an error signal at the input of any processor, the voltages at the bidirectional terminals of all the processors approach a reference voltage.

15. A pointer processor for an information transmission system, the pointer processor comprising:
- an input terminal for coupling to an output of a demultiplexer;
- an output terminal for coupling to an input of a multiplexer;
- a bidirectional terminal coupled to a common node; and
- alarm means coupled to the input terminal, to the output terminal and to the bidirectional terminal for:
    (i) causing a predetermined logic level to be asserted at the common node in response to an error signal at the processor input, and
    (ii) causing an alarm signal to appear at the processor output in response to the application of the predetermined logic level at the processor bidirectional terminal, and wherein the alarm means comprises
  an error detector,
  a wired-OR logic element coupled between the error detector and the bidirectional terminal, and
  a combinational logic element having inputs respectively coupled to the error detector and the wired-OR logic element and an output coupled to the output of the processor.

16. A pointer processor as defined in claim 15, wherein the error detector detects the presence of an STS-Nc signal.

* * * * *

UNITED STATES PATENT AND TRADEMARK OFFICE
CERTIFICATE OF CORRECTION

PATENT NO. : 6,973,041 B1  
APPLICATION NO. : 09/607912  
DATED : December 6, 2005  
INVENTOR(S) : Duchatko et al.

It is certified that error appears in the above-identified patent and that said Letters Patent is hereby corrected as shown below:

Column 14, Claim 2, line 7, please replace $V^{30}$ with --$V^+$--

Signed and Sealed this

Eleventh Day of July, 2006

JON W. DUDAS  
*Director of the United States Patent and Trademark Office*